US008661052B2

(12) United States Patent
Creem (10) Patent No.: US 8,661,052 B2
(45) Date of Patent: Feb. 25, 2014

(54) FUNCTIONAL CHANGE TRACKING FOR INDEPENDENT SOFTWARE PRODUCTS

(75) Inventor: Jeffrey M Creem, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 13/438,462

(22) Filed: Apr. 3, 2012

(65) Prior Publication Data

US 2012/0278357 A1    Nov. 1, 2012

Related U.S. Application Data

(60) Provisional application No. 61/480,886, filed on Apr. 29, 2011.

(51) Int. Cl.
*G06F 17/30* (2006.01)
(52) U.S. Cl.
USPC ........................................... 707/769

(58) Field of Classification Search
USPC .............................. 707/2, 3, 5, 769; 717/168
See application file for complete search history.

(56) References Cited

U.S. PATENT DOCUMENTS

| 6,397,221 B1 * | 5/2002 | Greef et al. ........................... 1/1 |
| 2006/0184927 A1 * | 8/2006 | Deblaquiere et al. ......... 717/168 |
| 2007/0168343 A1 * | 7/2007 | Best et al. .......................... 707/5 |

* cited by examiner

*Primary Examiner* — Etienne LeRoux
(74) *Attorney, Agent, or Firm* — Finch & Maloney PLLC; Neil F. Maloney (57) ABSTRACT

Techniques are disclosed that allow for automated tracking of changes to software modules between two or more software projects that use functionally similar but otherwise different software modules. The techniques can be used, for instance, to manage similar or identical changes to multiple otherwise independent software products. Thus, in accordance with an example embodiment, a software change that has been successfully applied to a first software product having a given functionality can be readily identified and applied to another software product that is independent of the first software product but can benefit from a similar software change.

18 Claims, 4 Drawing Sheets

Parent SCR Record
(#121)

General Software Product/Theme: Digital filter with coefficients quantized

Requestor: JMC/Team #7    Creation Date: January 11, 2012.

Problem/Feature/Upgrade Description: Limited quantization capability for coefficients.

Search Terms: filter, digital, coefficient, float, quantization, IIR, FIR quantized

Number of Children:
  Disposed:   5        (Click # to view Child SCRs)
  Pending:    1
  Total:      6

Click to view:   Next Parent SCR                              Print

Fig. 4a

Child SCR Record
(121-1)

Specific Software Product: Digital Filter with coefficients quantized in 8-bit

Requestor: JMC/Team #7    Creation Date: January 11, 2012.

Problem/Feature/Upgrade Description: Coefficients are quantized in 8-bit only. Need float and 16-bit quantization as well.

Search Terms: filter, digital, coefficient, float, quantization, IIR, FIR quantized, user interface, UI

Disposition/Functional Change: Updated filter function to include coefficients quantized in float and 16-bit; updated user interface to allow coefficient quantization selection. Click to view: code

Click to view:   Parent SCR   Next Sibling SCR                Print

FUNCTIONAL CHANGE TRACKING FOR INDEPENDENT SOFTWARE PRODUCTS

RELATED APPLICATION

This application claims the benefit of and priority to U.S. Provisional Application No. 61/480,886, filed on Apr. 29, 2011, which is herein incorporated by reference in its entirety.

STATEMENT OF GOVERNMENT INTEREST

The invention was made with United States Government support under contract HSSCHQ-04-C-00342 awarded by the Department of Homeland Security, and the United States Government has certain rights in this invention.

FIELD OF THE DISCLOSURE

The invention relates to change tracking, and more particularly, to a hierarchical change tracking for low cost product line software development.

BACKGROUND

Product line change management of related software products is generally accomplished using either a centralized or decentralized approach. With a centralized software product change management, a centralized authority or organization is generally established and maintained that manages the common components of a software system. Changes required to these components require, for instance, negotiation of schedule, cost, and release dates with the centralized authority. With a decentralized software product change management system, projects are free to modify unique copies of the common components.

SUMMARY

One embodiment of the present invention provides a system for functional change tracking of independent software products. The system includes a database for storing a plurality of child software change request (SCR) records, each record identifying a functional change made to a specific software product. The system further includes a software change management (SCM) module configured to allow a user to identify a code change suitable for a target software product, by searching SCR records associated with other software products independent of the target software product, but that have desired functionality. In some cases, the SCM module is further configured to allow users to create parent and child SCR records. In some cases, each of the child SCR records in the database is associated with a parent SCR record, wherein a parent SCR record may have one or more child SCR records. In some cases, a software product change for a functional change that is not identified in the database results in a parent SCR record being created for that functional change, along with a corresponding child SCR record. In one specific such case, a given parent record can have any number of child SCR records associated therewith, with at least one of those child SCR records being associated with a software product different than the target software product but having similar functionality to the target software product. In some cases, the database is searchable using standardized database queries. In some cases, a database schema prevents promotion of a parent SCR record ahead of the state of its children. In some cases, in response to a first project first initiating a change to a software product for a given functional problem, a single shared parent SCR record is created and then a new child SCR record is generated that is unique to the project. In one specific such case, a user associated with a subsequent project can periodically query the database to discover new parent SCRs for which that subsequent project has no child SCR. In some cases, the SCM module is further configured to allow users to update parent and child SCR records. In one such case, a given parent or SCR record can be updated by adding a disposition description, for instance.

Another embodiment of the present invention provides a computer readable medium for storing executable instructions thereon that, when executed by one or more processors, cause a method for functional change tracking of independent software products. The method includes storing in a database a plurality of child software change request (SCR) records, each record identifying a functional change made to a specific software product. In response to a user request, the method further includes identifying a code change suitable for a target software product, by searching SCR records associated with other software products independent of the target software product, but that have desired functionality. In some cases, in response to a user request, the method further includes creating parent and child SCR records. In some cases, a software product change request for a functional change that is not identified in the database results in a parent SCR record being created for that functional change, along with a corresponding child SCR record. In some cases, a given parent record can have any number of child SCR records associated therewith, with at least one of those child SCR records being associated with a software product different than the target software product but having similar functionality to the target software product. In some cases, in response to a first project first initiating a change to a software product for a given functional problem, a single shared parent SCR record is created and then a new child SCR record is generated that is unique to the project. In one specific such case, a user associated with a subsequent project can periodically query the database to discover new parent SCRs for which that subsequent project has no child SCR. In some cases, the method further includes allowing users to update parent and child SCR records.

Another embodiment of the present invention provides a method for functional change tracking of independent software products. The method includes storing in a database a plurality of child software change request (SCR) records, each record identifying a functional change made to a specific software product. In response to a user request, the method includes identifying a code change suitable for a target software product, by searching SCR records associated with other software products independent of the target software product, but that have desired functionality. In response to a first project first initiating a change to a software product for a given functional change, the method includes creating a single shared parent SCR record and generating a new child SCR record that is unique to the project. In one such case, the method includes allowing users to update parent and child SCR records.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Techniques are disclosed that allow for automated tracking of changes to software modules between two or more software projects that use functionally similar but different software modules. The techniques retain the low cost and flexibility of a decentralized software change management system, while simultaneously allowing for the tracking rigor associated with a centralized software change management system (but without the costs inherent in a typical centralized change management system). The techniques can be used, for instance, to manage similar or identical changes to multiple otherwise independent software products. Thus, in accordance with an example embodiment, a software change that has been successfully applied to a first software product having a given functionality can be readily identified and applied to solve a similar problem associated with another software product that is independent of the first software product. As will be appreciated in light of this disclosure, the techniques provided herein are not intended to be limited to tracking software bugs or problems or deficiencies per se, but actually can be applied to any change that is applied to software, such as a feature improvement. Moreover, the term "software" or "software product" as used herein is intended to include embedded code or firmware, source code, object code, or any other code that can be compiled and/or executed by a processor.

General Overview

Given the existence of functionally-related but distinct or otherwise independent software products that are being used by various independent stakeholders and/or funding structures and/or staff, an embodiment of the present invention can be used to manage those software products without costs and loss of flexibility inherent in a centralized product line management. The techniques provided can be used to manage similar or identical changes to multiple otherwise independent software products, so that a given change to one module can be identified and applied to another module independent of the other one, thereby allowing a degree of efficiency and leveraging of prior relevant work product.

As will be appreciated in light of this disclosure, the hierarchical software change tracking system and techniques provided herein are different from traditional software change revision tracking systems and techniques which are generally configured to simply decompose large software problems into smaller problems that are worked to closure within the context of a single software product. Such conventional repository systems generally include check-out/check-in and lock-based change tracking procedures to ensure that various changes and revisions to a given software product by multiple parties don't conflict or otherwise result in lost work product.

In one example embodiment of the present invention, a hierarchical software change tracking system is provided. All changes, regardless of the specific project or team that initiates the change, result in a 'parent' change request record being created. Projects (including the initiating project) then create 'child' change request records that are automatically linked to the root parent record. Thus, a given parent record can have any number of child change records associated therewith, with each of those child change records being from a different project (e.g., different product support team or organization). The system includes a change management database to which standardized database queries can be provided to facilitate tracking of changes from parent change requests to child change requests. Change tracking database schema prevents promotion of a parent change request ahead of the state of its children.

In more detail, and in accordance with one such example embodiment, all changes to a software product are accomplished by generating a Software Change Request (SCR) record. For the project first initiating a change to a software product for a given desired feature improvement, a single shared parent SCR is created and then a new child SCR is generated that is unique to the project that first initiates or discovers the need for a change. A subsequent project, such as one being carried out by a different support team or organization than the one that created the parent SCR and initial child SCR, that utilizes the same or similar software product can periodically query the change management database to discover new parent SCRs for which that specific project has no child SCR. For each new parent, every project can therefore create a child SCR and then disposition that request according to the needs of the project (e.g., disapproved as not applicable, approved to work, adopt software changes made by previous project, etc).

Thus, an embodiment of the present invention provides a hierarchical software change tracking system that enables various projects to track improvements, upgrades, and defect resolution between various related projects that utilize the same or similar, but nonetheless distinct software products. As will be further appreciated in light of this disclosure, such an embodiment also enables various projects to track improvements and defect resolution between unrelated projects that utilize software products having one or more similar functionalities. As such, functionality optimizations, repairs, upgrades, and other such updates and/or corrections that apply to one particular software product and that might be appropriate for other software products having the same or similar functionality can be identified. Having the ability to identify such product changes so they can be considered for relevancy to other products allows for leveraging of previous work efforts and therefore provides higher efficiency and return on investment. In addition, the need for a centralized product line management team or organization, or a substantial manual effort to understand and manage changes between the various software products, can be significantly reduced.

System Architecture

Figure 1:
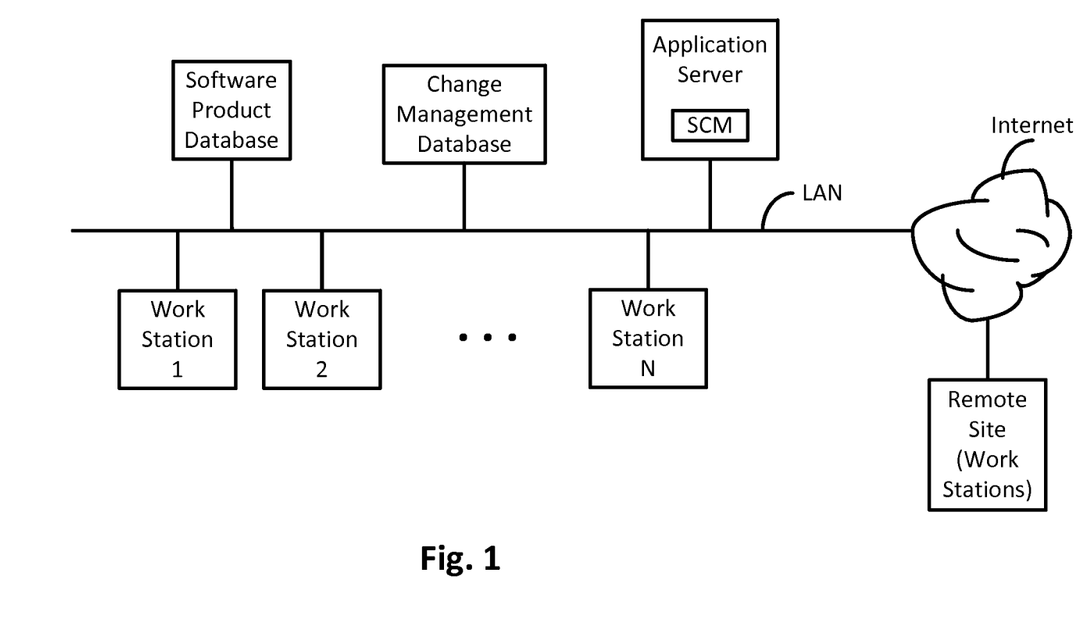
FIG. 1 illustrates a system configured to provide functional change tracking for independent software development, in accordance with an embodiment of the present invention.

FIG. 1 illustrates a system configured to provide functional change tracking for independent software development, in accordance with an embodiment of the present invention. As can be seen, the system includes a number of work stations operatively coupled to a local area network (LAN), a software product database, a change management database, and an application server. In addition, this example embodiment includes a remote work site that can access the LAN via the Internet or other suitable available wide area communication network.

This example system could be implemented, for example, at a corporation where software developers have work stations and can access the software product database associated with a given project on which they are working, so as to allow for development, modifying and compiling of software code. The workstation users can also access the application server to launch and utilize various functional applications, such as Microsoft Office® applications, software development tools and compilers, and/or a software change management (SCM) application configured in accordance with an embodiment of the present invention.

Each of the work stations (e.g., laptops, desktops, etc), software product database, and application server can be implemented as conventionally done using any number of suitable technologies, as will be appreciated. Likewise, any suitable networking technology can be used to implement the LAN (e.g., Ethernet, etc) and to allow for communication with the remote site by way of the Internet (e.g., virtual private network, T1 line, integrated services digital network, etc). Note that the remote site may have any number of work stations as well.

In accordance with one example embodiment, the SCM module allows users to create parent and child change request records as previously explained. For instance, in one such embodiment, when a user makes changes to a software product stored in the software product database, that user can launch the SCM module and generate an SCR record. As previously explained, for the project first initiating a change to a software product for a given problem or otherwise desired feature improvement, a single shared parent SCR is created and then a new child SCR is generated that is unique to the project that first initiates or discovers the need for a change (Project A, for example). In this example embodiment, the SCM module is further programmed or otherwise configured to allow a user to generate these records, and to store them in the change management database. A subsequent project (Project B, for example), such as one being carried out by another user (e.g., different product support team, etc), that utilizes the same or similar software product can periodically query the change management database to discover new parent SCRs for which that specific project (Project B in this example) has no child SCR. For each new parent, that subsequent project (Project B, in this example), or any other subsequent project (Projects C, D, and E, for example), can therefore create a child SCR and then disposition that request according to the needs of that particular project. Example dispositions include, for instance: disapproved as not applicable; approved to work; adopt software changes made by previous project; etc). Continuing with this example embodiment, the SCM module can therefore be further programmed or otherwise configured to allow a user to query the change management database for existing parent and/or child records, and to create new child change request records for parent change request records discovered during the query.

The change management database can be implemented with any conventional hierarchical database technology and the claimed invention is not intended to be limited to any particular type or configuration. Even a relational database (not hierarchical in nature) or a look-up table indexed by software product to which associated change records apply can be used, if so desired. The SCM module can be coded with any suitable language, such as Ada, C, C++, Object Oriented C, Visual Basic, etc. Numerous instruction sets can be used to implement the functions described herein. The various system modules (e.g., SCM module, etc) can be, for example, encoded on any computer readable medium (e.g., hard drive, CD or diskette, thumb drive, server, etc), such that when executed by one or more processors (e.g., computer system or smartphone), the techniques for tracking software changes described herein are carried out. Numerous variations will be apparent in light of this disclosure.

Note that in some example embodiments, the SCM module can be automatically launched, for example, as part of a repository function associated with the software product database. For instance, when a user checks-out a particular software product from the software product database, the repository function can be configured to launch the SCM module thereby requiring the user either to indicate that the product is being checked-out because of a previously created parent/child SCR or to create a new parent/child SCR or for some other reason. An override function can be provided, to address situations where the parent/child SCR is not particularly relevant to the check-out. Other such automatic SCM module launching schemes will be apparent in light of this disclosure. Example SCM module structure and functionality will be further discussed in detail with reference to FIG. 3.

Hierarchical Database

Figure 2:
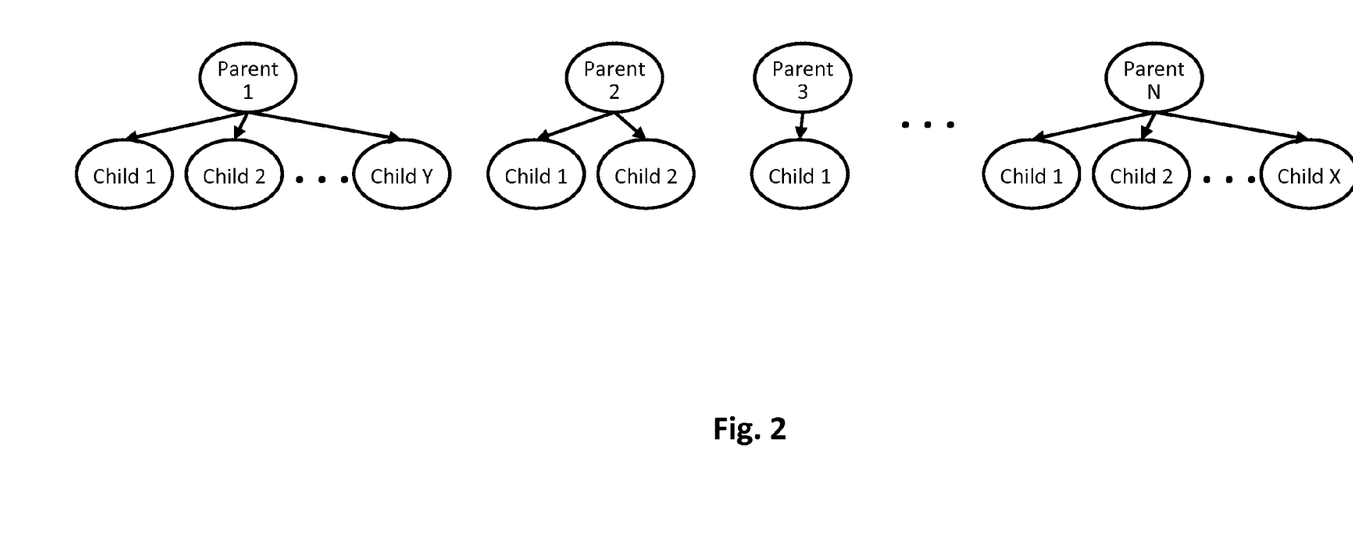
FIG. 2 illustrates an example set of software change request records that can be created and stored by the system shown in FIG. 1, in accordance with an embodiment of the present invention.

FIG. 2 illustrates an example set of software change request records that can be created and stored in a hierarchical fashion in the change management database, in accordance with an embodiment of the present invention. As can be seen, the stored records include N parent SCR records, each associated with a general software product/theme and a specific problem/feature that was identified with respect to that product. In addition, each parent SCR includes one or more child SCR records, with each record associated with a particular software product and a specific problem/feature associated with the corresponding parent SCR.

There are Y child SCR records associated with the parent 1 SCR record. Each child can further be associated with a disposition as previously explained, wherein the disposition to the request is indicated in that record. For instance: the child 1 SCR record can be associated with a disposition of: 'adapted output module to correct known formatting problem associated with Team 2 project'; the child 2 SCR record can be associated with a disposition of: 'adopted Team 2 change to output module for Team 6 project'; and the child Y SCR record can be associated with a disposition of: 'not applicable to Team 7 project, as output module not used'. Such records are available for review and consideration by other projects/teams, thereby enabling a software product change tracking process, so that functional changes/upgrades made to any one software product can be identified and made to other software products having the similar functionality and/or needs. As will be appreciated in light of this disclosure, the change tracking database schema prevents promotion of a parent change request ahead of the state of its children.

As will be appreciated, the terms "problem" or "functional problem" as used herein in describing embodiments of the present invention are intended to broadly include bugs, deficiencies, feature improvements, or any functional or otherwise substantive change that is applied to software. Thus, the terms "problem" or "functional problem" are not limited to a malfunctioning or otherwise sub-par software product; rather, a functional problem may broadly include, for instance, a post-coding discovery of desired functionality that was not accounted for in the original code. Thus, in some embodiments, any number of the SCR records created and tracked as described herein may be documenting feature improvements to a software product that are not bugs at all. So, as an example, assume Team X has a software product X that has the capability to detect surface-to-air missiles. Further assume that Team Y has derived software product Y from software product X, but has added support for new aircraft, new missions, and/or other functionality that in general is not relevant for software product X. At some point, however, Team Y further upgrades software product Y to include an ability to detect hostile gunfire. A team member associated with software product X (Team X, in this example scenario), upon running queries against the SCR records database, can see this new feature and realize that it can do a value added upgrade for its customer. In this sense, there is no deficiency being addressed in software product X; rather, new capabilities are being efficiently identified and implemented.

SCM Module Methodology

Figure 3:
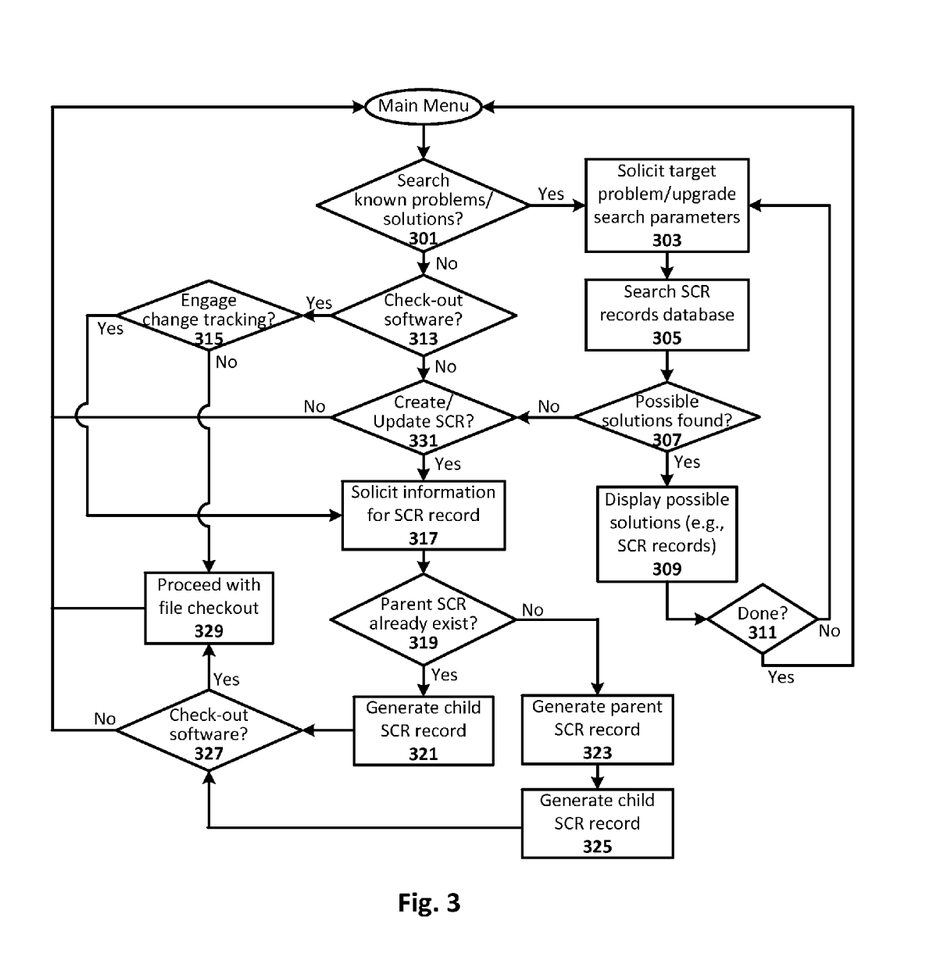
FIG. 3 illustrates a method configured to provide functional change tracking for independent software development, in accordance with an embodiment of the present invention.

FIG. 3 illustrates a method configured to provide functional change tracking for independent software development, in accordance with an embodiment of the present invention. As will be appreciated in light of this disclosure, the method can be implemented, for example, in the software change management (SCM) application shown in FIG. 1, in accordance with an embodiment of the present invention. Other applications will be apparent.

As can be seen, the methodology can be implemented so as to present the user with a main menu once the SCM module is launched and running. In this example embodiment, the user can effectively launch three main functions: (1) search the software change request (SCR) records database for existing solutions to a functional problem (which includes searching for desirable features or upgrades as will be appreciated in light of this disclosure) associated with one or more software products; (2) check-out a software product for revisioning or whatever reason; or (3) create an SCR record for a functional problem associated with a specific software product. Depending on the user's selection, the methodology will proceed accordingly. Each decision path of the example embodiment is now discussed.

If, at 301, the user decides to search the SCR records database for existing solutions to a software functional problem/feature/upgrade (generally referred to as problem hereinafter), then the method continues with soliciting, at 303, the user for search parameters relevant to that particular problem. The software functional problem may be, for instance, a software bug or functional deficiency associated with a given software product with which the user is working. The search term or terms entered at 303 can then be used to query the SCR records database for records exhibiting or otherwise indicative of those search terms. Any suitable search technology can be used to execute the search query, including automatic synonym searching and record ranking to measure the strength with which a given record matches the given search parameters.

Upon completion of the search, a determination at 307 is made as to whether any possible solutions relevant to the search were found. If not, then the user may be given an opportunity to create or update an SCR record, if so desired, and as indicated at 331, which will be discussed in turn. If possible solutions relevant to the search were found, then those solutions can be displayed to the user, as shown at 309. The solutions may be in the form, for example, of SCR records that include a disposition, or some other record or file that includes a brief description of a relevant functional problem and how it was resolved (or otherwise implemented in the case of feature improvements, upgrades and the like). In one such example embodiment, the solutions can be presented to the user one or more identified parent SCR records in a queued hyper-link fashion, thereby allowing the user to review each of the identified parent SCR records, including any related children SCRs and relevant software code or code changes made.

In one example embodiment, the search queue may list the relevant parent SCRs and a brief snippet of the general problem/feature addressed by the SCR. For instance, see the search queue represented in Table 1.

TABLE 1

Example Search Results Page

| | SCR# | SCR DESCRIPTION. |
|---|---|---|
| 1) | Parent SCR#121 | Digital filter coefficient quantization |
| 2) | Parent SCR#187 | Digital filter coefficient resolution |
| 3) | Parent SCR#251 | Digital filter coefficient granularity |
| 4) | . | . |
| 5) | . | . |

Figure 4A:
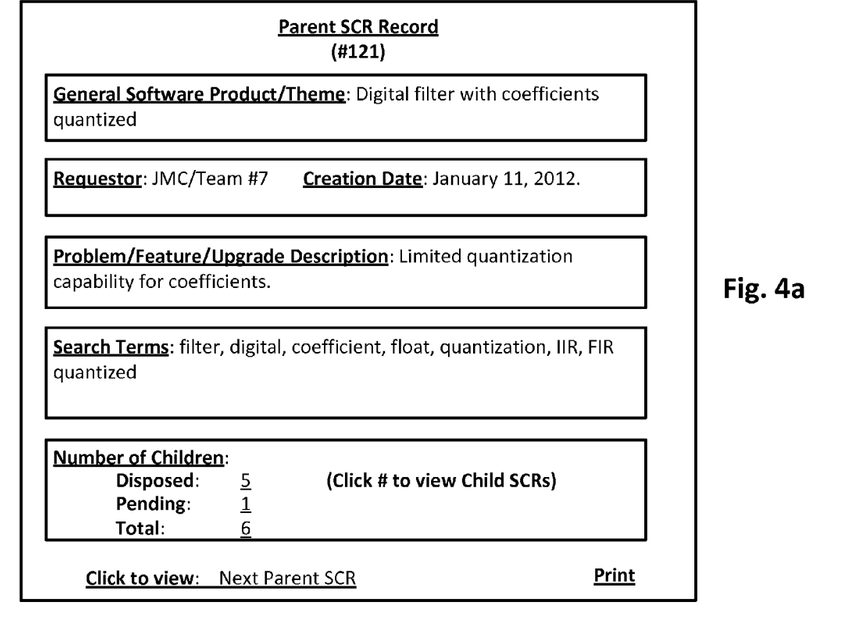
FIG. 4a illustrates an example parent software change request (SCR) record that can be created and stored by the system shown in FIG. 1, in accordance with an embodiment of the present invention.

As will be appreciated, these highly specific search results are merely intended to provide one example, and other searches will return search results relevant to that particular search. In any such cases, and in accordance with one embodiment of the present invention, the user can then mouse click or otherwise select one of the search results and view the selected parent SCR to determine if it includes helpful information that can be used to resolve the software functional problem of interest to the user, which may include a desired upgrade in functionality. For instance, FIG. 4a illustrates an example parent SCR record that could be displayed in response to the user selecting the first result in the example search queue shown in Table 1.

As can be seen, the parent SCR record (#121 in this example case) includes a number of informational fields, including a general software product or theme with which the problem is associated, the requestor and creation date of the record, a brief problem description, various relevant search terms that can be used to locate the record, and the number of children SCRs associated with that parent SCR record. In such embodiments, the user can use the back arrow (assuming a browser-like application is provided as the user interface) to go back to the search result. Alternatively, the user can mouse click or otherwise select the Next Parent SCR hyperlink at the bottom of the page to view the next result in the search queue, in some embodiments. Further note that the user can mouse click or otherwise select to view any related child SCRs if so desired, in some such example embodiments.

Figure 4B:
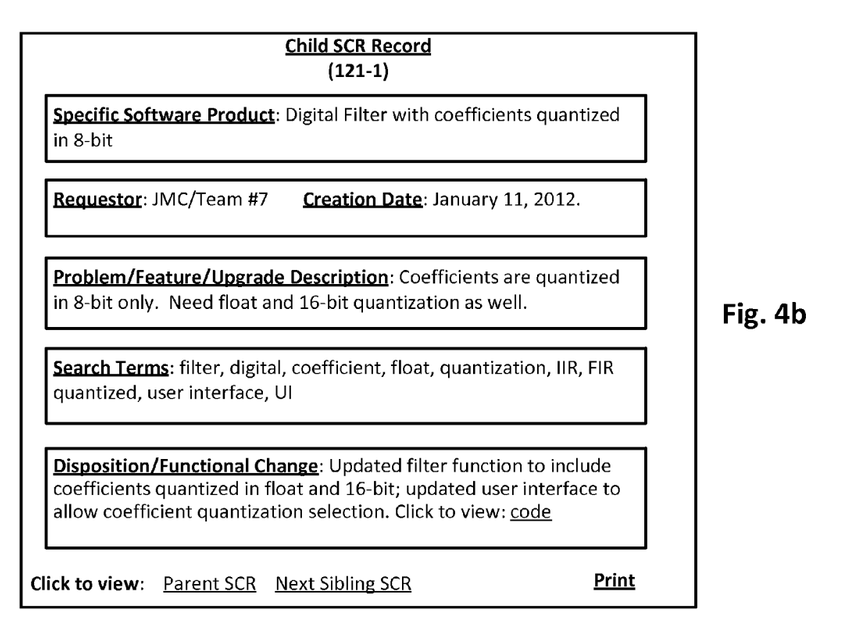
FIG. 4b illustrates an example child SCR record that can be created and stored by the system shown in FIG. 1, in accordance with an embodiment of the present invention.

For instance, assuming the user selects the hyperlinked '5' to view the five disposed child SCRs, the resulting example child SCR record shown in FIG. 4b can then be displayed to the user. As can be seen, the child SCR record (#121-1 in this example case, indicating it is the first child SCR under the parent SCR #121) includes a number of informational fields, including a specific software product with which the target problem is associated, the requestor and creation date of the record, a brief problem description, various relevant search terms that can be used to locate the record, and the disposition. In some such example embodiments, the disposition box may further include a hyperlink to the relevant software code and/or further detailed files explaining the software changes made. As previously explained, in some such embodiments, the user can use the back arrow (assuming a browser-like application is provided as the user interface) to go back to the search results. Alternatively, the user can mouse click or otherwise select the Next Sibling SCR hyperlink at the bottom of the page to view the next child SCR record. In a similar fashion, the user can select Parent SCR hyperlink to go back to the referring parent SCR record page, in some embodiments.

Numerous user interface schemes can be used, and variations and configurations will be apparent in light of this disclosure, and the claimed invention is not intended to be limited to any particular user interface, whether it be implemented as a browser-based interface, graphical user interface, or any other suitable user interface technology that allows a user to access the change tracking system. Other example user interface features may include, for instance, an Update SCR hyperlink, which when selected causes that SCR record to be opened in editable format so a user can make updates to that SCR. An example update may be, for instance, adding new search terms, refining the problem description, and/or adding disposition comments. That SCR can then be saved back to the database. A print function can be provisioned in the user interface as well, as shown in the examples of FIGS. 4a-b.

With further to FIG. 3, once the various possible solutions have been displayed or otherwise provided to the user at 309, a determination can be made as to whether the user is done with the search or wishes to refine the search, as generally indicated at 311. If the user wishes to refine the search, then the method continues with soliciting the refined search terms, at 303. If, however, the user is done searching, then the method returns the user interface to the main menu.

If, at 301, the user does not wish to search the SCR records database, then the method continues with determining, at 313, if the user wishes to check-out a software product (for modifying that software, or some other reason). If so, then a determination is made at 315 as to whether the user wishes to engage an SCR-based change tracking function as described herein. In other embodiments, note that the SCR-based change tracking function can be engaged automatically or otherwise mandated, and in still other embodiments, the repository control system responsible for checking files in and out of the repository can be kept completely separate from the SCR-based change tracking function system. In such cases, note that 313 and 315 could be omitted. In the example embodiment shown, if the user does not wish to engage the SCR-based change tracking function, then the method proceeds with file check-out, at 329. This file check-out can be carried out using, for example, an existing repository system with which the SCR-based change tracking function as described herein is integrated or otherwise operational with. Upon completion of the check-out process at 329, the method returns to the main menu. If, on the other hand, the user does wish to engage the SCR-based change tracking function at 315, then the method of this example embodiment proceeds with soliciting information for the SCR record, at 317.

In one such case, the information solicited at 317 for the SCR record includes the various information indicated in the SCR records of FIGS. 4a and 4b. For instance, the user can be prompted to provide the following information: requestor name; software product name; problem description; and relevant search terms. Other and/or different pertinent information may be collected as well, as will be appreciated. For instance, the user wishes to update or modify an existing SCR at 331, then the soliciting at 317 may include querying the user for a record ID or description so that SCR record of interest can be retrieved and updated.

Once the SCR information is received at 317, the method of this example embodiment continues with determining if a relevant parent SCR already exists, at 319. If not, then the method continues with generating a parent SCR record at 323, and then generating a child SCR record at 325. If, on the other hand, a relevant parent SCR already does exist, then the method continues with generating a child SCR record at 321. The parent and/or child SCR records generated may be, for instance, like the ones shown in FIGS. 4a and 4b, respectively. Once the appropriate SCR records have been created, the user is given an opportunity to check-out the software product, at 327. If the user does wish to check out the software product, then the method continues with the file check-out process, at 329. Upon completion of the check-out process, the method returns to the main menu. If the user does not wish to check out the software product at 327, then the method returns to the main menu.

If, at 313, the user does not wish to check-out a software product, then the method continues with determining, at 331, if the user wishes to create an SCR or to update or otherwise modify an existing SCR record. If not, then the method returns to the main menu. If, on the other hand, the user wishes to create or update an SCR, then the method continues at 317 with soliciting the user for information that can be used to create an SCR record, as previously explained. If updating or modifying an existing SCR at 331, then the method may include querying the user for a record ID or description so that SCR can be retrieved and updated. In some such embodiments, the updating may include, for instance, adding a disposition and/or refining the problem description and/or adding search terms that will increase the usefulness of the SCR. Note that an initial query to the user at 317 can solicit whether the user wishes to create a new SCR record, or to update an existing SCR record.

Numerous variations on this methodology will be apparent in light of this disclosure. As will be appreciated, each of the functional boxes (Main Menu, 303, 305, 309, 317, 321, 323, 325, and 329) and decision points (301, 307, 311, 313, 315, 319, 327, and 331) shown in FIG. 3 can be implemented as a module or sub-module that, when executed by one or more processors, cause the associated functionality as described herein to be carried out. The modules/sub-modules may be implemented in gate level logic as well (e.g., field programmable gate array or purpose-built silicon). In other embodiments, the modules/sub-modules may be implemented as one or more embedded routines of a microcontroller having I/O capability for soliciting input from the user and providing responses to user requests.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for functional change tracking of independent software products, the system comprising:
   a database for storing a plurality of child software change request (SCR) records, each record identifying a functional change made to a specific software product; and
   a software change management (SCM) module configured to allow a user to identify a code change suitable for a target software product, by searching SCR records associated with other software products independent of the target software product, but that have desired functionality, and further configured to allow users to create parent and child SCR records.

2. The system of claim 1 wherein each of the child SCR records in the database is associated with a parent SCR record, wherein a parent SCR record may have one or more child SCR records.

3. The system of claim 1 wherein a software product change for a functional change that is not identified in the database results in a parent SCR record being created for that functional change, along with a corresponding child SCR record.

4. The system of claim 3 wherein a given parent record can have any number of child SCR records associated therewith, with at least one of those child SCR records being associated with a software product different than the target software product but having similar functionality to the target software product.

5. The system of claim 1 wherein the database is searchable using standardized database queries.

6. The system of claim 1 wherein a database schema prevents promotion of a parent SCR record ahead of the state of its children.

7. The system of claim 1 wherein in response to a first project first initiating a change to a software product for a given functional problem, a single shared parent SCR record is created and then a new child SCR record is generated that is unique to the project.

8. The system of claim 7 wherein a user associated with a subsequent project can periodically query the database to discover new parent SCRs for which that subsequent project has no child SCR.

9. The system of claim 1 wherein the SCM module is further configured to allow users to update parent and child SCR records.

10. The system of claim 9 wherein a given parent or SCR record can be updated by adding a disposition description.

11. A computer readable medium for storing executable instructions thereon that, when executed by one or more processors, cause a method for functional change tracking of independent software products, the method comprising:
   storing in a database a plurality of child software change request (SCR) records, each record identifying a functional change made to a specific software product; and
   in response to a user request, identifying a code change suitable for a target software product, by searching SCR records associated with other software products independent of the target software product, but that have desired functionality, and creating parent and child SCR records.

12. The computer readable medium of claim 11 wherein a software product change request for a functional change that is not identified in the database results in a parent SCR record being created for that functional change, along with a corresponding child SCR record.

13. The computer readable medium of claim 12 wherein a given parent record can have any number of child SCR records associated therewith, with at least one of those child SCR records being associated with a software product different than the target software product but having similar functionality to the target software product.

14. The computer readable medium of claim 11 wherein in response to a first project first initiating a change to a software product for a given functional problem, a single shared parent SCR record is created and then a new child SCR record is generated that is unique to the project.

15. The computer readable medium of claim 14 wherein a user associated with a subsequent project can periodically query the database to discover new parent SCRs for which that subsequent project has no child SCR.

16. The computer readable medium of claim 15 wherein the method further comprises allowing users to update parent and child SCR records.

17. A method for functional change tracking of independent software products, the method comprising:
   storing in a database a plurality of child software change request (SCR) records, each record identifying a functional change made to a specific software product;
   in response to a user request, identifying a code change suitable for a target software product, by searching SCR records associated with other software products independent of the target software product, but that have desired functionality; and
   in response to a first project first initiating a change to a software product for a given functional change, creating a single shared parent SCR record and generating a new child SCR record that is unique to the project.

18. The method of claim 17 further comprising allowing users to update parent and child SCR records.

* * * * *